US012001960B2

(12) United States Patent
Wang et al.

(10) Patent No.: US 12,001,960 B2
(45) Date of Patent: Jun. 4, 2024

(54) NGRAPH-BASED GPU BACKEND DISTRIBUTED TRAINING METHOD AND SYSTEM

(71) Applicant: Inspur Suzhou Intelligent Technology Co., Ltd., Suzhou (CN)

(72) Inventors: Li Wang, Suzhou (CN); Fang Cao, Suzhou (CN); Zhiyong Qiu, Suzhou (CN); Zhenhua Guo, Suzhou (CN)

(73) Assignee: INSPUR SUZHOU INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 18/034,566

(22) PCT Filed: Jul. 29, 2021

(86) PCT No.: PCT/CN2021/109206
§ 371 (c)(1),
(2) Date: Apr. 28, 2023

(87) PCT Pub. No.: WO2022/105295
PCT Pub. Date: May 27, 2022

(65) Prior Publication Data
US 2023/0316089 A1    Oct. 5, 2023

(30) Foreign Application Priority Data
Nov. 19, 2020    (CN) .......................... 202011302180.0

(51) Int. Cl.
*G06N 3/098*    (2023.01)
*G06F 9/54*    (2006.01)
*G06F 13/00*    (2006.01)

(52) U.S. Cl.
CPC ............ *G06N 3/098* (2023.01); *G06F 9/546* (2013.01); *G06F 13/00* (2013.01)

(58) Field of Classification Search
None
See application file for complete search history.

(56) References Cited

U.S. PATENT DOCUMENTS

| | | | |
|---|---|---|---|
| 2019/0205745 A1* | 7/2019 | Sridharan | G06F 9/5061 |
| 2019/0378016 A1 | 12/2019 | John et al. | |
| 2020/0051201 A1 | 2/2020 | Zhang et al. | |

FOREIGN PATENT DOCUMENTS

| | | |
|---|---|---|
| CN | 106951926 | 7/2017 |
| CN | 110908799 | 3/2020 |

(Continued)

OTHER PUBLICATIONS

Cyphers et al, 'Intel® nGraph™', [online, downloaded Oct. 11, 2023], arXiv:1801.08058v2. (Year: 2018).*

(Continued)

*Primary Examiner* — Yu Chen
(74) *Attorney, Agent, or Firm* — Crowell & Moring LLP

(57) ABSTRACT

An nGraph-based graphics processing unit (GPU) backend distributed training method and system, a computer-readable storage medium, and an electronic device. The method includes: receiving a training request, and obtaining corresponding training data; obtaining a Nvidia® Collective multi-GPU Communication Library (NCCL) file by means of a system path of the NCCL file linked to an nGraph framework; invoking an NCCL communication interface configuration according to the training request to obtain a training model, the NCCL communication interface is an NCCL file-based communication operation interface located at a GPU backend of the nGraph framework; and performing (Continued)

GPU backend training on the training data using the training model. The present application can satisfy an urgent need of a user for performing neural network distributed training on the basis of an nGraph GPU backend, thus further improving the performance of deep learning network training.

11 Claims, 1 Drawing Sheet

(56) References Cited

FOREIGN PATENT DOCUMENTS

| | | |
|---|---|---|
| CN | 110969198 | 4/2020 |
| CN | 110991614 | 4/2020 |
| CN | 111124656 | 5/2020 |
| CN | 111274018 | 6/2020 |
| CN | 112465112 | 3/2021 |

OTHER PUBLICATIONS

NcclDocs, 'NCCL 2.6', [online, downloaded Oct. 12, 2023], https://docs.nvidia.com/deeplearning/nccl/archives/nccl_264/nccl-developer-guide/docs, Feb. 6. (Year: 2020).*
Ben-Nun et al, 'A Modular Benchmarking Infrastructure for High-Performance and Reproducible Deep Learning', [online, downloaded Oct. 12, 2023], arXiv:1901.10183v2. (Year: 2019).*
Woodie A., 'Inside Intel's nGraph, a Universal Deep Learning Compiler', [online, downloaded Oct. 11, 2023], https://www.datanami.com/2018/04/26/inside-intels-ngraph-a-universal-deep-learning-compiler. (Year: 2018).*
International Search Report and Written Opinion of corresponding PCT application No. PCT/CN2021/109206 mailed Sep. 28, 2021 including translations (14 pages).
Search report of corresponding CN priority application (CN202011302180.0) Apr. 21, 2022 (2 pages).
Notification to Grant Patent Right for Invention of corresponding CN priority application (CN202011302180.0) May 7, 2022 including translation (2 pages).

* cited by examiner

NGRAPH-BASED GPU BACKEND DISTRIBUTED TRAINING METHOD AND SYSTEM

This application is the national phase application of International Patent Application No. PCT/CN2021/109206, filed Jul. 29, 2021, which claims priority to Chinese Patent Application No. 202011302180.0, filed on Nov. 19, 2020 in China National Intellectual Property Administration and entitled "nGraph-based GPU Backend Distributed Training Method and System", each of which are hereby incorporated by reference in their entirety.

TECHNICAL FIELD

The present application relates to the field of machine learning, in particular to an nGraph-based graphics processing unit (GPU) backend distributed training method and system, and a relevant apparatus.

BACKGROUND ART

In recent years, with the rise of artificial intelligence (AI), deep neural networks (DNNs) have been widely used in image and video classification, speech recognition, language translation and the like. With the growth of training data sets and the increasing complexity of a network scale, demands of deep learning for massive computation have led to continuous innovation of hardware architectures. Various deep learning frameworks (TensorFlow, pytorch, and the like) are committed to deep modification of the frameworks in their respective application scenarios to improve training performance in each hardware backend (CPU, GPU, FPGA, and ASIC). In a development process of different deep learning applications, users need not only to adapt to various frameworks, but also to support all kinds of AI acceleration device hardware. The users need to spend a lot of energy and much time for migration and optimization, which greatly limits the development efficiency of the AI applications. In view of the above problems, as a deep neural network model compiler for various devices and frameworks, an nGraph framework can greatly reduce the complexity of optimizing the deep learning performance across frameworks and hardware platforms, and expand the applicability and portability of a deep learning model. At present, front-end deep learning frameworks that have been supported by nGraph or are developing include TensorFlow, MXNet, PaddlePaddle, and the like, and backend hardware acceleration devices that have been supported or are developing include a central processing unit (CPU), a neural network processor (NNP), and various GPUs.

A GPU is a main acceleration device for large-scale neural network model training at present. In order to improve the performance of neural network model training, a Nvidia® GPU acceleration device is mainly used to realize cross-device distributed parallel training of large-scale neural network models in various application scenarios of deep learning. In an earlier version of nGraph, a support for OpenMPI open message passing interface (OpenMPI)-based multi-machine distributed parallel training was provided. However, in its later version update, in order to centrally optimize the training performance of a single machine and a single card, the support for distributed training was removed. The nGraph framework of the current version only supports single-machine and single-card training of a CPU, a GPU and other backends, which greatly limits the application scope of the nGraph framework.

SUMMARY

The present application aims to provide an nGraph-based GPU backend distributed training method and system, a computer-readable storage medium and an electronic device, which can improve the performance of deep learning network training.

In order to solve the above technical problems, the present application provides an nGraph-based GPU backend distributed training method. A specific technical solution is as follows:

receiving a training request, and obtaining corresponding training data;
obtaining a Nvidia® Collective multi-GPU Communication Library (NCCL) file by means of a system path of the NCCL file linked to an nGraph framework;
invoking an NCCL communication interface configuration according to the training request to obtain a training model, wherein the NCCL communication interface is an NCCL file-based communication operation interface located at a GPU backend of the nGraph framework; and
performing GPU backend training on the training data using the training model.

In an embodiment, before receiving the training request, and obtaining the corresponding training data, the method further includes:
adding the system path of the NCCL file to a source code of the nGraph framework; and
modifying a compiling file of the nGraph framework, enabling an NCCL function in a distributed function of the nGraph framework, and performing, in response to the NCCL function being enabled, the step of obtaining the NCCL file by means of the system path of the NCCL file linked to the nGraph framework.

In an embodiment, invoking the NCCL communication interface configuration according to the training request to obtain the training model further includes:
determining a distributed training type of the training model according to the training request, wherein the distributed training type includes multi-machine distributed training and single-machine distributed training.

In an embodiment, before performing the GPU backend training on the training data using the training model, the method further includes:
performing environment training initialization;
in response to the distributed training type of the training model being the multi-machine distributed training, performing the environment training initialization includes:
performing message passing interface (MPI) initialization and NCCL initialization; and
in response to the distributed training type of the training model being the single-machine distributed training, performing the environment training initialization includes:
performing NCCL initialization.

In an embodiment, after performing GPU backend training on the training data using the training model, the method further includes:
releasing occupied memory resources and process resources, and ending the step of invoking the NCCL communication interface.

In an embodiment, before invoking the NCCL communication interface configuration according to the training request to obtain the training model, the method further includes:
- obtaining a communication operation function;
- performing parameter parsing on the communication operation function; and
- establishing a function call relationship between parameters obtained by the parsing and a corresponding operation of the NCCL operation, to obtain the NCCL communication interface.

In an embodiment, the NCCL communication interface includes an NCCL-based aggregation operation, an NCCL-based broadcast operation, an NCCL-based send operation and an NCCL-based receive operation.

The present application further provides an nGraph-based GPU backend distributed training system, including:
- a request receiving module, configured for receiving a training request, and obtaining corresponding training data;
- a file obtaining module, configured for obtaining a Nvidia® Collective multi-GPU Communication Library (NCCL) file by means of a system path of the NCCL file linked to an nGraph framework;
- a model generation module, configured for invoking an NCCL communication interface configuration according to the training request to obtain a training model, the NCCL communication interface being an NCCL file-based communication operation interface located at a GPU backend of the nGraph framework; and
- a training module, configured for performing GPU backend training on the training data using the training model.

The present application further provides a computer-readable storage medium, storing a computer program. The computer program, when executed by a processor, implements the steps of the above method.

The present application further provides an electronic device, including a memory and a processor. The memory stores a computer program, and the processor invokes the computer program in the memory to implement the steps of the above method.

The present application provides an nGraph-based graphics processing unit (GPU) backend distributed training method, including: receiving a training request, and obtaining corresponding training data; obtaining a Nvidia® Collective multi-GPU Communication Library (NCCL) file by means of a system path of the NCCL file linked to an nGraph framework; invoking an NCCL communication interface configuration according to the training request to obtain a training model, wherein the NCCL communication interface is an NCCL file-based communication operation interface located at a GPU backend of the nGraph framework; and performing GPU backend training on the training data using the training model.

The present application integrates an NCCL in a server system into the nGraph framework, which can not only support usage of the communication interface function in the NCCL to optimize communication operations on the nGraph GPU backend, but also supports users to independently select a distributed training manner as the NCCL during compilation. Secondly, the GPU backend supports NCCL communication interfaces such as Allreduce. Based on this design, after the distributed training of the GPU backend of the nGraph framework is achieved, the nGraph can support the distributed training of deep learning networks of the GPU backend, and the application range of the nGraph framework is expanded, whereby the nGraph framework can not only support a variety of deep learning frameworks, but also meet urgent needs of users for the distributed training of neural networks based on the nGraph GPU backend, which further improves the performance of deep learning network training.

The present application further provides a GPU backend distributed training system, a computer-readable storage medium and an electronic device, having the above beneficial effects which will not be repeated here.

BRIEF DESCRIPTION OF THE DRAWINGS

In order to describe the embodiments of the disclosure or the technical solutions in the existing art more clearly, drawings required to be used in the embodiments or the illustration of the existing art will be briefly introduced below. Apparently, the drawings in the illustration below are only some embodiments of the present application. Those ordinarily skilled in the art also can obtain other drawings according to the provided drawings without creative work.

DETAILED DESCRIPTION

Figure 1:
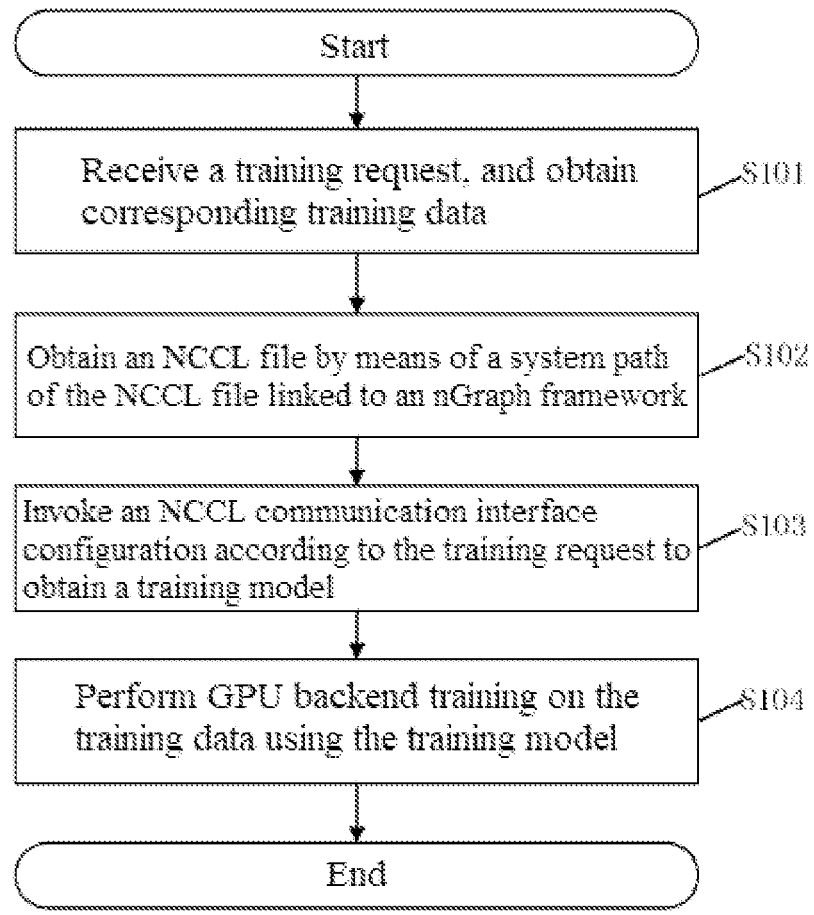
FIG. 1 is a flowchart of an nGraph-based GPU backend distributed training method according to an embodiment of the present application.

In order to make the objectives, technical schemes and advantages of the embodiments of the present application clearer, the technical schemes in the embodiments of the present application will be described clearly and completely below in combination with the drawings in the embodiments of the present application. Apparently, the embodiments described are part of the embodiments of the present application, not all the embodiments. Based on the embodiments in the present application, all other embodiments obtained by those of ordinary skill in the art without creative work all fall within the protection scope of the present application.

Multi-GPU parallel training is often required in deep learning, and a Nvidia® Collective multi-GPU Communication Library (NCCL) of Nvidia® is often used in multi-card parallel running of various deep learning frameworks (Cafe/Tensorflow/Torch/Tano). Nvidia® has made many optimizations to communication strategies in the NCCL to achieve a higher communication speed on PCIe, Nvlink (a bus and its communication protocol), InfiniBand (literally translated as "infinite bandwidth" technology, abbreviated as IB, which is a computer communication standard). In order to achieve the objective of distributed training on a GPU backend of an nGraph framework, and make full use of the advantages of an NCCL that is an NVIDIA® GPU communication library, the present disclosure provides a GPU backend distributed training method. In order to describe this method more clearly, the following describes configuration steps before the solution is performed:

In order to apply an NCCL in an nGraph framework, it is necessary to integrate the NCCL installed in a server system into the nGraph framework, whereby communication operations in the NCCL can be directly used in subsequent steps.

Integrating the NCCL into the nGraph framework mainly includes two processes:

(1) Add a system path of an NCCL file to a source code of the nGraph framework: a FindNCCL.cmake file can be added to a cmake cloud of the source code of the nGraph, whereby the nGraph framework can automatically recognize the NCCL that has been installed in a system and link it to the system path where the NCCL file is located.

(2) Modify a compiling file of the nGraph framework and enable an NCCL function in a distributed function of the nGraph framework:

An NCCL option is added to the distributed function of the nGraph, whereby, when a user enables the distributed NCCL function, the path of the NCCL file is transmitted to the compiling file of the nGraph. After the integration of the NCCL is completed, cmake is performed again, and then the nGraph is compiled and installed, that is, the NCCL is integrated to the source code of the nGraph framework to facilitate the use of the NCCL by other files in the nGraph. After the compiling file of the nGraph framework is modified, the NCCL function is enabled.

In addition to the need for integrating the NCCL to the nGraph framework, in order to facilitate the communication operations, a communication operation interface corresponding to the NCCL needs to be configured. Because the GPU backend of the nGraph framework provides a list of unsupported operations, including allreduce (aggregation), send (send), recv (receive) and other operations related to the communication operations, distributed network training of the GPU backend cannot be supported. In order to achieve the distributed training of deep learning tasks of the GPU backend, it is necessary to add a communication interface support to the GPU backend of the nGraph framework, whereby the GPU backend can not only support the communication operations such as Allreduce, but also achieve distributed operations of the NCCL. Therefore, the added communication-related operation support mainly includes: Allreduce, Broadcast, Send, Recv, and the like. These operations all have optimized operations in the NCCL, separately corresponding to ncclAllreduce, ncclBroadcast, ncclSend and ncclRecv, that is, an NCCL-based aggregation operation, an NCCL-based broadcast operation, an NCCL-based send operation and an NCCL-based receive operation. It should be noted that each kind of operation corresponds to one corresponding interface. Those skilled in the art can also configure interfaces for other communication-related operations on this basis, which should also fall within the protection scope of the present application.

A process of configuring a communication operation interface corresponding to an NCCL is provided here:

Step I: Obtain a communication operation function.

Step II: Perform parameter parsing on the communication operation function.

Step III: Establish a function call relationship between parameters obtained by the parsing and a corresponding operation of the NCCL operation, to obtain the NCCL communication interface.

In Step I, it is necessary to obtain the communication operation function. The communication operation function includes but is not limited to Allreduce, Broadcast, Send, Recv, and the like described above. Those skilled in the art can also configure corresponding communication operation interfaces for operations required in a training process. In Step I, it is necessary to obtain the operation function corresponding to the communication operation. The operation function contains an operation object and operation manner of the communication operation. It is defined in the form of a function to obtain the corresponding communication operation function. After that, the parameter parsing is performed on the communication operation function to obtain parameters including the operation object, the manner and the like, and is called with a corresponding operation configuration function in the NCCL, whereby the communication operation function selected by the user can directly act on the corresponding operation in the NCCL during the of the GPU backend, so as to achieve the corresponding communication operation in the NCCL.

In other words, the process of configuring the communication operation interface corresponding to the NCCL is actually also to establish a mapping between the communication operation of the GPU backend of the nGraph and the corresponding communication operation in the NCCL.

After the above configuration is completed, in a deep learning training program of the user, if a GPU acceleration device is specified, a deep learning distributed parallel training process of the GPU backend under the nGraph framework can be realized.

Referring to FIG. 1, FIG. 1 is a flow chart of an nGraph-based GPU backend distributed training method according to an embodiment of the present application. The method includes:

S101: Receive a training request, and obtain corresponding training data.

This step aims to receive the training request and obtain the corresponding training data. No certain restrictions are made on how to receive the training request and how to obtain the corresponding training data.

S102: Obtain an NCCL file by means of a system path of the NCCL file linked to an nGraph framework.

This step aims to obtain the NCCL file according to the system path of the NCCL file. Because the NCCL file has been linked to the nGraph framework in the configuration process described above, the NCCL file can be obtained directly according to recorded address information.

S103: Invoke an NCCL communication interface configuration according to the training request to obtain a training model.

This step aims to invoke the NCCL communication interface to process the training data. In addition, the NCCL communication interface is an NCCL file-based communication operation interface located at the GPU backend of the nGraph framework. In other words, the NCCL file obtained in Step S102 is the basis for invoking the NCCL communication interface, that is, the NCCL file contains Corresponding instructions or codes of the NCCL communication interface. A module can be integrated at the GPU backend to facilitate directly invoking the NCCL communication interface in the module during the distributed training.

It should be noted that the training model in this step is actually a function computation graph, that is, the training model contains the training process in the subsequent training process, instead of an actual data processing process. That is, in this step, parameters, such as invoking those NCCL communication interfaces for the training data and an invoking order, in the execution process are added to the training model, whereby, when the training model executes training, the training is executed according to the execution process recorded in the training model.

In related technologies, because the NCCL has not been integrated to the nGraph framework, the NCCL file and the NCCL communication interface cannot be invoked in the process of generating the training model, and distributed parallel training of NCCL-based nGraph GPU backend deep learning cannot be achieved.

As an execution manner of this step, a distributed training type of the training model can also be determined according to the training request during the execution of this step. The distributed training type includes multi-machine distributed training and single-machine distributed training. Any distributed training type can include four processes: environment initialization, GPU device allocation, communication operation implementation, and device resource release. The environment initialization of the multi-machine distributed training includes MPI initialization and NCCL initialization, while the single-machine distributed training only includes NCCL initialization. The GPU device allocation process mainly implements assigning tasks to different GPUs on the basis of a parallel quantity and serial numbers of distributed computation. In the communication operation implementation process, the mapping from a customized communication-related operation of the GPU backend of the nGraph to a communication operation configured in the NCCL needs to be completed. This module includes data reading, data type processing and other operations.

S104: Perform GPU backend training on the training data using the training model.

After the training model is obtained in Step S103, the training model can be used to perform the GPU backend training on the training data. In practical applications of the present application, the communication interface support in the NCCL can be added to the GPU backend of the nGraph framework on the basis of the above, whereby the GPU backend in the distributed training process can directly support communication operations such as ncclAllreduce.

There is no certain restriction on the specific execution process of the GPU backend training herein, which usually includes establishment of the GPU backend, the environment initialization and the like.

As an execution manner, after the GPU backend training is performed on the training model, it occupied memory resources and process resources can also be released, and the step of invoking the NCCL communication interface is ended. After the corresponding communication operations are completed, the occupied device memory, MPI process resources and other occupied resources are released, and the step of invoking the NCCL communication interface is ended, which is conducive to reducing the occupation of system resources and improving the system performance.

The embodiments of the present application integrate an NCCL in a server system to an nGraph framework, which can not only supports using a communication interface function in the NCCL to optimize communication operations on the nGraph GPU backend, but also supports users to independently select a distributed training manner as the NCCL during compilation. Secondly, the GPU backend supports NCCL communication interfaces such as Allreduce. Based on this design, after the distributed training of the GPU backend of the nGraph framework is achieved, the nGraph can support the distributed training of deep learning networks of the GPU backend, and the application range of the nGraph framework is expanded, whereby the nGraph framework can not only support a variety of deep learning frameworks, but also meet urgent needs of users for the distributed training of neural networks based on the nGraph GPU backend, which further improves the performance of deep learning network training.

The following describes the nGraph-based GPU backend distributed training method disclosed above with a GPU backend distributed training process:

Step I: Construct a function computation graph.
Step II: Establish a GPU backend.
Step III: Input data.
Step IV: Create a storage space for the input data.
Step V: Write the input data to a model, and perform distributed training according to the function computation graph.
Step VI: Output a training result.

In an actual training process, the function computation graph needs to be constructed first. The function computation graph contains configuration data in the training process, including a training manner, that is, a multi-machine distributed training manner or a single-machine distributed training manner, a resource allocation manner and a device allocation manner. The function computation graph also includes related processes such as obtaining the NCCL file and invoking an NCCL communication interface. That is, the function computation graph is equivalent to a "manual" of the distributed training, which contains the configuration data and the training process, whereby the distributed training is performed after the data is input. In the distributed training program, there will be communication operations such as Allreduce that aggregate multi-node gradient data. Users only need to specify an establishing backend of a distributed training code as a GPU in the distributed training program, to achieve the distributed training of the GPU backend. Of course, the training request in the previous embodiment can be placed in the function computation graph as the configuration data, and the NCCL communication interface configuration can be invoked according to information in the function computation graph to obtain the training model to train the input data.

The following is an introduction of an nGraph-based GPU backend distributed training system provided by an embodiment of the present application. The GPU backend distributed training system described below may refer to the nGraph-based GPU backend distributed training method described above.

Figure 2:
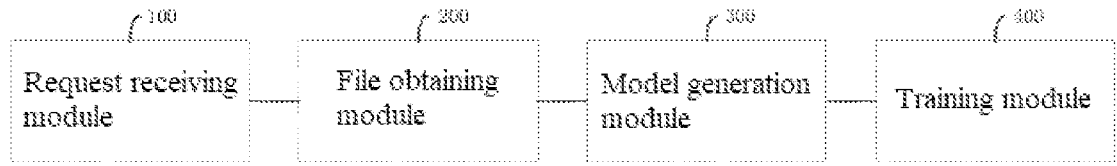
FIG. 2 is a schematic structural diagram of an nGraph-based GPU backend distributed training system according to an embodiment of the present application.

Referring to FIG. 2, the present application further provides an nGraph-based GPU backend distributed training system, including:
- a request receiving module 100, configured for receiving a training request, and obtaining corresponding training data;
- a file obtaining module 200, configured for obtaining a Nvidia® Collective multi-GPU Communication Library (NCCL) file by means of a system path of the NCCL file linked to an nGraph framework;
- a model generation module 300, configured for invoking an NCCL communication interface configuration according to the training request to obtain a training model, the NCCL communication interface being an NCCL file-based communication operation interface located at a GPU backend of the nGraph framework; and
- a training module 400, configured for performing GPU backend training on the training data using the training model.

Based on the above embodiment, as a preferable embodiment, the system further includes:
- a configuration module, configured for adding the system path of the NCCL file to a source code of the nGraph framework; and modifying a compiling file of the nGraph framework, enabling an NCCL function in a distributed function of the nGraph framework, and allowing, when the NCCL function is enabled, to enter the file obtaining module.

Based on the above embodiment, as a preferable embodiment, the system further includes:
- a type determining module, configured for determining a distributed training type of the training model according to the training request, the distributed training type including multi-machine distributed training and single-machine distributed training.

Based on the above embodiment, as a preferable embodiment, the system further includes:
an environment initialization module, configured for: performing GPU backend training on the training data using the training model; performing environment training initialization;
if the distributed training type of the training model is the multi-machine distributed training, the environment initialization module is configured for performing MPI initialization and NCCL initialization; and
if the distributed training type of the training model is the single-machine distributed training, the environment initialization module is configured for performing NCCL initialization.

Based on the above embodiment, as a preferable embodiment, the system may further include:
a resource release module, configured for releasing occupied memory resources and process resources, and ending the step of invoking the NCCL communication interface.

Based on the above embodiment, as a preferable embodiment, the system may further include:
a communication operation interface configuration module, configured for: obtaining a communication operation function; performing parameter parsing on the communication operation function; and establishing a function call relationship between parameters obtained by the parsing and a corresponding operation of the NCCL operation, to obtain the NCCL communication interface.

The present application further provides a computer-readable storage medium, which stores a computer program. The computer program, when executed, can implement the steps of the nGraph-based GPU backend distributed training method according to the above embodiment. The storage medium includes: a USB flash disk, a mobile hard disk, a read-only memory (ROM), a random access memory (RAM), a magnetic disk or an optical disk, and other media that can store program codes.

The present application further provides an electronic device, which may include a memory and a processor. The memory stores a computer program, and the processor can invoke the computer program in the memory to implement the steps of the nGraph-based GPU backend distributed training method according to the above embodiment. Of course, the electronic device may also include various network interfaces, power supplies, and other assemblies.

All the embodiments in the specification are described in a progressive manner. Contents mainly described in each embodiment are different from those described in other embodiments. Same or similar parts of all the embodiments refer to each other. The system provided by the embodiments is relatively simply described as it corresponds to the method provided by the embodiments, and related parts refer to part of the descriptions of the method.

The principles and implementations of the present application are described herein by using specific examples, and the descriptions of the above embodiments are only used to help understand the method of the present application and the core idea of the method. It should be pointed out that for those skilled in the art, without departing from the principle of the present application, several improvements and modifications can also be made to the present application, and these improvements and modifications also fall within the protection scope of the claims of the present application.

It should be noted that in this specification, relational terms such as first and second are used merely to distinguish one entity or operation from another entity or operation, instead of necessarily requiring or implying that these entities or operations have any of these actual relationships or orders. Furthermore, terms "include", "including" or any other variants are meant to cover non-exclusive inclusions, whereby a process, method, object or device that includes a series of elements not only includes those elements, but also includes other elements which are not definitely listed, or further includes inherent elements of this process, method, object or device. Without more restrictions, elements defined by a sentence "includes a/an . . . " do not exclude that the process, method, object or device that includes the elements still includes other identical elements.

What is claimed is:

1. An nGraph-based graphics processing unit (GPU) backend distributed training method, comprising:
receiving a training request, and obtaining corresponding training data;
obtaining a Collective multi-GPU Communication Library (CCL) file by means of a system path of the CCL file linked to an nGraph framework;
obtaining a communication operation function, and configuring corresponding communication operation interfaces for operations, to establish a mapping between communication operation of the nGraph-based GPU backend and corresponding communication operation in the CCL;
performing parameter parsing on the communication operation function;
establishing a function call relationship between parameters obtained by the parsing and a corresponding operation of the CCL operation, to obtain a CCL communication interface;
invoking a CCL communication interface configuration according to the training request to obtain a training model, wherein the CCL communication interface is a CCL file-based communication operation interface located at a GPU backend of the nGraph framework;
determining a distributed training type of the training model according to the training request, wherein the distributed training type comprises a multi-machine distributed training or a single-machine distributed training;
in response to the distributed training type of the training model comprising the multi-machine distributed training, performing environment training initialization by: performing message passing interface (MPI) initialization and CCL initialization; and
in response to the distributed training type of the training model comprising the single-machine distributed training, performing the environment training initialization by: performing CCL initialization; and
performing GPU backend training on the training data using the training model.

2. The nGraph-based GPU backend distributed training method according to 52 claim 1, wherein before receiving the training request and obtaining the corresponding training data, the method further comprises:
adding the system path of the CCL file to a source code of the nGraph framework; and
modifying a compiling file of the nGraph framework, enabling a CCL function in a distributed function of the nGraph framework, and performing, in response to the CCL function being enabled, the obtaining the CCL file by means of the system path of the CCL file linked to the nGraph framework.

3. The nGraph-based GPU backend distributed training method according to claim 1, wherein after performing GPU backend training on the training data using the training model, the method further comprises:
releasing occupied memory resources and process resources, and ending the invoking the]CCL communication interface.

4. The nGraph-based GPU backend distributed training method according to claim 1, wherein the CCL communication interface comprises a CCL-based aggregation operation, a CCL-based broadcast operation, a CCL-based send operation and a CCL-based receive operation.

5. A non-transitory computer-readable storage medium, storing a computer program, wherein the computer program, upon execution by a processor, is configured to cause the processor to:
receive a training request, and obtain corresponding training data;
obtain a Collective multi-GPU Communication Library (CCL) file by means of a system path of the CCL file linked to an nGraph framework;
obtain a communication operation function, and configure corresponding communication operation interfaces for operations, to establish a mapping between communication operation of the nGraph-based GPU backend and corresponding communication operation in the CCL;
perform parameter parsing on the communication operation function;
establish a function call relationship between parameters obtained by the parsing and a corresponding operation of the CCL operation, to obtain a CCL communication interface;
invoke a CCL communication interface configuration according to the training request to obtain a training model, wherein the CCL communication interface is a CCL file-based communication operation interface located at a GPU backend of the nGraph framework;
determine a distributed training type of the training model according to the training request, wherein the distributed training type comprises a multi-machine distributed training or a single-machine distributed training;
in response to the distributed training type of the training model comprising the multi-machine distributed training, perform message passing interface (MPI) initialization and CCL initialization; and
in response to the distributed training type of the training model comprising the single-machine distributed training, perform CCL initialization; and
perform GPU backend training on the training data using the training model.

6. The non-transitory computer-readable storage medium according to claim 5, wherein the computer program, upon execution by the processor, is further configured to cause the processor to:
add the system path of the CCL file to a source code of the nGraph framework; and
modify a compiling file of the nGraph framework, enable a CCL function in a distributed function of the nGraph framework, and perform, in response to the CCL function being enabled, the obtaining the CCL file by means of the system path of the CCL file linked to the nGraph framework.

7. The non-transitory computer-readable storage medium according to claim 5, wherein the computer program, upon execution by the processor, is further configured to cause the processor to:
release occupied memory resources and process resources, and end the invoking the CCL communication interface.

8. The non-transitory computer-readable storage medium according to claim 5, wherein the CCL communication interface comprises a CCL-based aggregation operation, a CCL-based broadcast operation, a CCL-based send operation and a CCL-based receive operation.

9. An electronic device, comprising:
a memory and a processor, wherein the memory stores a computer program, and the processor, upon execution of the computer program, is configured to:
receive a training request, and obtain corresponding training data;
obtain a Collective multi-GPU Communication Library (CCL) file by means of a system path of the CCL file linked to an nGraph framework;
obtain a communication operation function, and configure corresponding communication operation interfaces for operations, to establish a mapping between communication operation of the nGraph-based GPU backend and corresponding communication operation in the CCL;
perform parameter parsing on the communication operation function;
establish a function call relationship between parameters obtained by the parsing and a corresponding operation of the CCL operation, to obtain a CCL communication interface;
invoke a CCL communication interface configuration according to the training request to obtain a training model, wherein the CCL communication interface is a CCL file-based communication operation interface located at a GPU backend of the nGraph framework;
determine a distributed training type of the training model according to the training request, wherein the distributed training type comprises a multi-machine distributed training or a single-machine distributed training;
in response to the distributed training type of the training model comprising the multi-machine distributed training, perform message passing interface (MPI) initialization and CCL initialization; and
in response to the distributed training type of the training model comprising the single-machine distributed training, perform CCL initialization; and
perform GPU backend training on the training data using the training model.

10. The electronic device according to claim 9, wherein the processor, upon execution of the computer program, is further configured to:
add the system path of the CCL file to a source code of the nGraph framework; and
modify a compiling file of the nGraph framework, enable a CCL function in a distributed function of the nGraph framework, and perform, in response to the CCL function being enabled, the obtaining the CCL file by means of the system path of the CCL file linked to the nGraph framework.

11. The electronic device according to claim 9, wherein the processor, upon execution of the computer program, is further configured to:

release occupied memory resources and process resources, and end the invoking the CCL communication interface.

\* \* \* \* \*